US012665405B2

(12) United States Patent
Pringle

(10) Patent No.: US 12,665,405 B2
(45) Date of Patent: Jun. 23, 2026

(54) MODULAR ACCESS CHAMBER AND METHOD OF ASSEMBLY

(71) Applicant: Plura Composites Ltd, Moreton (GB)

(72) Inventor: Graeme Pringle, Merseyside (GB)

(73) Assignee: POLYPIPE LIMITED, Leeds (GB)

( * ) Notice: Subject to any disclaimer, the term of this patent is extended or adjusted under 35 U.S.C. 154(b) by 252 days.

(21) Appl. No.: 18/185,060

(22) Filed: Mar. 16, 2023

(65) Prior Publication Data

US 2023/0299571 A1 Sep. 21, 2023

(51) Int. Cl.
*H02G 9/10* (2006.01)
*G02B 6/50* (2006.01)

(52) U.S. Cl.
CPC .............. *H02G 9/10* (2013.01); *G02B 6/501* (2023.05)

(58) Field of Classification Search
CPC H02G 9/10; H02G 3/08; H02G 3/081; H02G 3/086; G02B 6/501; E02D 29/12; H05K 5/00; H05K 5/02; H05K 5/0217
(Continued)

(56) References Cited

U.S. PATENT DOCUMENTS 3,564,112 A * 2/1971 Algotsson ................ H02B 1/40
174/535
6,002,086 A * 12/1999 Yajima ................ H05K 9/0022
174/387
(Continued)

FOREIGN PATENT DOCUMENTS

DE 202007014465 U1 12/2007
EP 1916342 A1 4/2008
(Continued)

OTHER PUBLICATIONS

Anonymous; "Next Generation Pre-formed Structural Access Chambers & Covers", Information Brochure Gst V001, Oct. 8, 2022 (Oct. 8, 2022), pp. 1-9, XP093044197, Retrieved from the Internet: URL:https://www.plastechsouthern.co.uk/wp-content/uploads/2020/04/GENUS_Final_Draft.pdf.
(Continued)

*Primary Examiner* — Angel R Estrada
(74) *Attorney, Agent, or Firm* — Renner, Otto, Boisselle & Sklar, LLP

(57) ABSTRACT

A modular access chamber, shown generally at 1000, is suitable for providing access to underground services (not shown), such as telecommunications cable systems and the like, and is designed to be supplied in component form, for assembly on site. The chamber may be constructed to be of different depths and is generally rectangular in plan, comprising first and second types of connectable wall portions, 1100 and 1200 and a cover 1300.
The wall portions 1100 and 1200 interlock to form a substantially continuous perimeter wall, for example such that the wall portions 1100 each comprise a substantially C-shaped part of the perimeter of the completed access chamber, whereas the wall portions 1200 form substantially linear parts of the perimeter.
The cover 1300 has an integral tread pattern 1310 to provide a non-slip surface. It is also provided with fixing apertures 1320 for receiving fixings (not shown) to secure the cover to the wall portions beneath and lifting apertures 1330 for receiving a lifting tool (not shown) which may be used to lift the cover from the access chamber to gain access to an interior.

19 Claims, 18 Drawing Sheets

(58) Field of Classification Search
USPC ......... 174/37, 50, 520, 535, 53, 57, 58, 559,
174/560, 561; 220/3.2–3.9, 4.02;
248/906
See application file for complete search history.

(56) References Cited

U.S. PATENT DOCUMENTS

| | | | | | |
|---|---|---|---|---|---|
| 6,100,468 | A | * | 8/2000 | Niggl | H05K 7/1447 |
| | | | | | 174/559 |
| 6,157,715 | A | * | 12/2000 | Daoud | H04Q 1/028 |
| | | | | | 220/4.02 |
| 6,359,218 | B1 | * | 3/2002 | Koch | H05K 5/0021 |
| | | | | | 174/50 |
| 6,541,699 | B1 | * | 4/2003 | Lindemulder | H05K 9/0073 |
| | | | | | 174/58 |
| 7,511,967 | B2 | * | 3/2009 | Loda | H05K 5/30 |
| | | | | | 174/50 |
| 7,589,974 | B2 | * | 9/2009 | Grady | H05K 7/1492 |
| | | | | | 174/520 |
| 7,759,575 | B2 | * | 7/2010 | Jones | H02G 3/086 |
| | | | | | 174/559 |
| 2021/0318356 | A1 | * | 10/2021 | Cook | G08C 17/02 |

FOREIGN PATENT DOCUMENTS

| | | | | | |
|---|---|---|---|---|---|
| FR | 2715676 | A1 | | 8/1995 | |
| GB | 2302703 | A | | 1/1997 | |
| GB | 2404409 | A | | 2/2005 | |
| GB | 2455788 | A | * | 6/2009 | ............ E02D 29/12 |
| GB | 2598623 | A | | 3/2022 | |

OTHER PUBLICATIONS

International Search Report for corresponding International Application No. PCT/GB2023/050611, issued Jun. 15, 2023.
Great Britain Search Report for corresponding Application No. GB2303780.7, issued Aug. 29, 2023.
Plastech (Southern) LTD, 2020, plastechsouthern.co.uk Available from: https://vvvvw.plastechsouthern.co.uk/wp-content/uploads/2020/04/GENUSFinal Draft.pdf [Accessed Oct. 8, 2022].

* cited by examiner

1110

1140

1140

1160

1145

1160

1500

1260

1245

1600

1200

1400

1200

1600

1000

1200

R

R

R

R

C

2400

R'

R'

R'

2600

2200

2200

2100

2100

MODULAR ACCESS CHAMBER AND METHOD OF ASSEMBLY

The present invention relates to a modular access chamber suitable for use in providing access to underground services particularly, although not exclusively, in underground 'cable' networks, such as are found in the telecommunications industry.

Many services require underground cables and conduits which must be kept safe from both environmental factors, and also from theft, whilst also being accessible for monitoring and maintenance purposes.

The terrain through which underground services travel can have uneven surfaces, and any access chamber, for providing an opening to the services, must be made to accommodate different depths. Ideally, a cover for the chamber should be placed flush with a ground surface so as not to create a potential hazard, such as a trip hazard.

Whilst pre-fabricated access chambers of specific dimensions, for example in cast concrete, have been used in the prior art, this solution requires the installation contractor to maintain an inventory of several sizes of unit. Modular access chambers have been considered, but these have been either difficult to assemble, perhaps because of small or fiddly components, or else are bulky to store and/or to ship. As a result of them being difficult to assemble, previously considered modular access chambers have often had to be pre-assembled, before delivery to the installation site. This is inconvenient as it means that additional local transportation is required.

Embodiments of the present invention aim to provide a modular access chamber for providing access to underground cables that at least partially addresses the aforementioned problems.

The present invention is defined in the attached independent claims, to which reference should now be made. Further, preferred features may be found in the sub-claims appended thereto.

According to one aspect of the present invention, there is provided a modular access chamber suitable for providing access to underground services, the chamber comprising a plurality of connectable wall portions and a cover member, wherein the wall portions are stackable to permit the height of the chamber to be adjusted and wherein one or more of the wall portions comprises a rebate portion for receiving the cover member.

Preferably, the rebate portion is integrally formed with the wall portion.

The wall portions may connect together to form a ring unit. Preferably the wall portions are arranged to meet at an interface comprising a stepped profile. The wall portions preferably comprise the rebate portion at or adjacent upper edges thereof. The wall portions may comprise profiles at lower edges thereof, which profiles are preferably shaped so as to compliment/fit with the rebate of another wall portion when the wall portions are stacked.

Preferably, when the wall portions connect together to form a ring unit, the rebates on the wall portions become aligned, to provide a substantially continuous rebate surface. More preferably the rebate may receive a lower edge of another wall portion stacked thereon or preferably, if the wall portion is an uppermost one, the rebate may receive the cover.

Preferably, at least four wall portions are connectable to form the ring unit. More preferably, only four wall portions are required to form one ring unit. The cover may be arranged to be secured to one or more of the wall portions, more preferably by fixing means arranged to pass at least partly through one or more of the cover and the wall portion.

The wall portions may connect together to form a ring unit by matingly engaging connecting parts, such as male/female parts, more preferably grooves and projections, on ends of the wall portions. Optionally, fixing means may be used to reinforce the connections between the wall portions.

Preferably, ring units can be stacked, one upon the other, so that internal surfaces of the wall portions lie substantially flush with one another.

The cover portion may comprise a lifting key slot. The cover portion may comprise a non-slip tread pattern.

There may be a protrusion, such as a lip feature around at least a part of an outer surface of the wall portion(s). The lips may be used as aids for removing a wall portion or ring unit from the ground and/or from a ring unit beneath. The protrusions may also provide a keying feature to help secure the access chamber after back-filling of earth, during and/or after installation.

The wall portions may comprise markings on their outside surface. The marking may indicate a suitable place to drill a hole through the wall portions. Cables may be fed through such holes into the chamber. Alternatively, or in addition, cables may travel upwards from the ground and into the chamber.

The wall portion may comprise a molded component and preferably comprises plastics material. Preferably the wall portion comprises a thermoplastics material, for example polypropylene.

The cover portion may comprise a plastics material. Preferably the cover portion may comprise a thermoplastics material, for example polypropylene. Preferably, the wall portions and/or the cover portions may be formed by injection molding.

According to a further aspect of the present invention, there is provided a method of assembling a modular access chamber for providing access to underground services, the method comprising the steps of connecting together a plurality of wall portions and placing a cover into a rebate portion on an inner surface of the wall portion.

The method may include locating the cover in a rebate portion that is integrally formed in/with the wall portion.

Preferably, the method comprises connecting together wall portions to form a ring unit. The ring units are preferably stackable, and the method preferably includes stacking ring units to achieve a required height of the access chamber.

The access chamber may be according to any statement herein.

The invention may include any combination of the features or limitations referred to herein, except such a combination of features as are mutually exclusive, or mutually inconsistent.

A preferred embodiment of the present invention will now be described, by way of example only, with reference to the accompanying diagrammatic drawings, in which:

FIG. 15 shows the access chamber of FIGS. 13 and 14 with several stacked tiers;

FIG. 17a is a perspective sectional view of a ring assembled from wall sections according to a third embodiment of the present invention;

FIG. 17b is an enlarged view of a part of FIG. 17a; and

Figure 1:
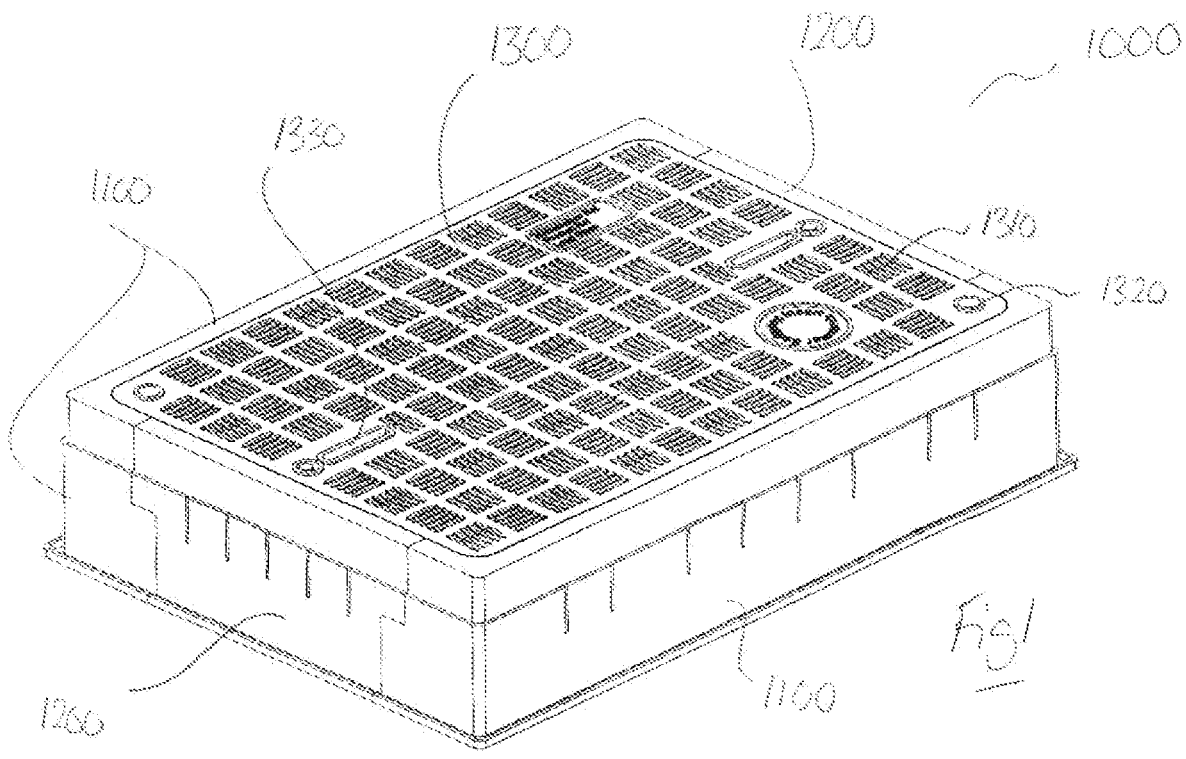
FIG. 1 is a perspective view of a first embodiment of modular access chamber, according to the present invention.

Turning to FIG. 1, this shows generally at 1000 a first embodiment of access chamber, according to the present invention. The access chamber is suitable for providing access to underground services (not shown), such as telecommunications cable systems and the like, and is designed to be supplied in component form, for assembly on site. The chamber may be constructed to be of different depths, as will be described below.

The modular access chamber 1000 is generally rectangular in plan and comprises first and second types of connectable wall portions, 1100 and 1200 and a cover 1300.

The wall portions 1100 and 1200 are molded components, optionally of plastics material, such as polypropylene for example. The cover 1300 may also comprise a molding of plastics, or else may be of another suitable material, such as metal, for example steel.

The wall portions 1100 and 1200 interlock to form a substantially continuous perimeter wall. In the embodiment shown, the wall portions 1100 each comprise a substantially C-shaped part of the perimeter of the completed access chamber, whereas the wall portions 1200 form substantially linear parts of the perimeter. In one example, the long sides of the access chamber may be 900 mm in length and the short sides may be 600 mm in length, but other wall sizes may be used.

The cover 1300 has an integral tread pattern 1310 to provide a non-slip surface. It is also provided with fixing apertures 1320 for receiving fixings (not shown) to secure the cover to the wall portions beneath and lifting apertures 1330 for receiving a lifting tool (not shown) which may be used to lift the cover from the access chamber to gain access to an interior.

Figure 2:
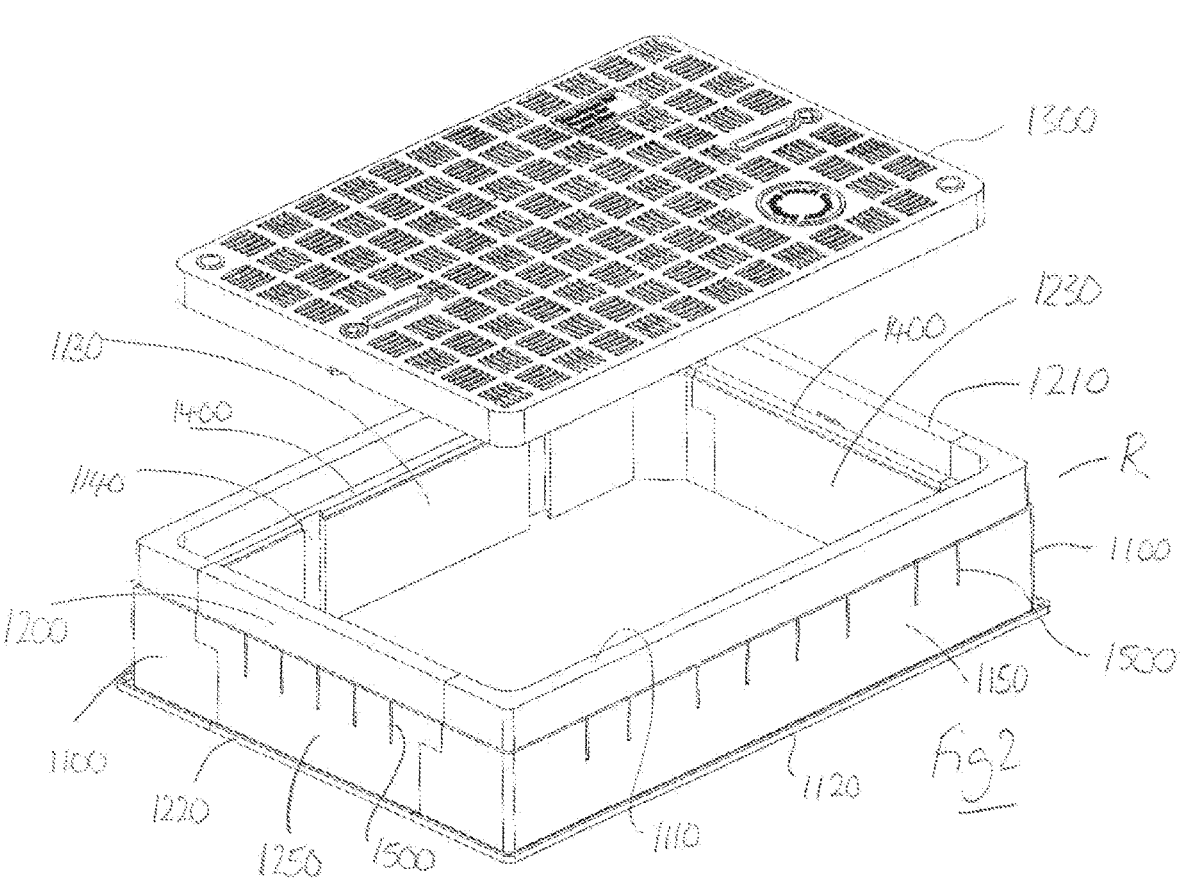
FIG. 2 is a perspective view of the access chamber of FIG. 1, with a cover removed.

FIG. 2 shows the access chamber 1000 with the cover 1300 lifted therefrom, to partly reveal the interior of the chamber. The wall portions 1100 and 1200 each comprise an upper edge, respectively 1110 and 1210, and a lower edge respectively 1120 and 1220. The wall portions 1100 and 1200 form a step-shaped rebate 1400 which extends, preferably substantially continuously, around internal surfaces 1130 and 1230 of the wall portions, just below the upper edges thereof at a depth substantially equal to a thickness of the cover 1300. The rebate 1400 is provided to support the cover 1300, so that when the cover is in place, it lies substantially flush, i.e. level, with the upper edges of the wall portions, as is shown in FIG. 1.

On at least the internal surface 1130 of the wall portions 1100 there are provided recessed channels 1140 for receiving cable conduits (not shown) in use.

Around outer surfaces 1150, 1250 of the wall portions 1100 and 1200 there are provided markings, in this case in the form of grooves 1500, at spaced locations. These markings are provided to indicate suitable places for the wall portion to be drilled through, or cut into, for example to allow entry or exit of cabling if required.

Figure 3:
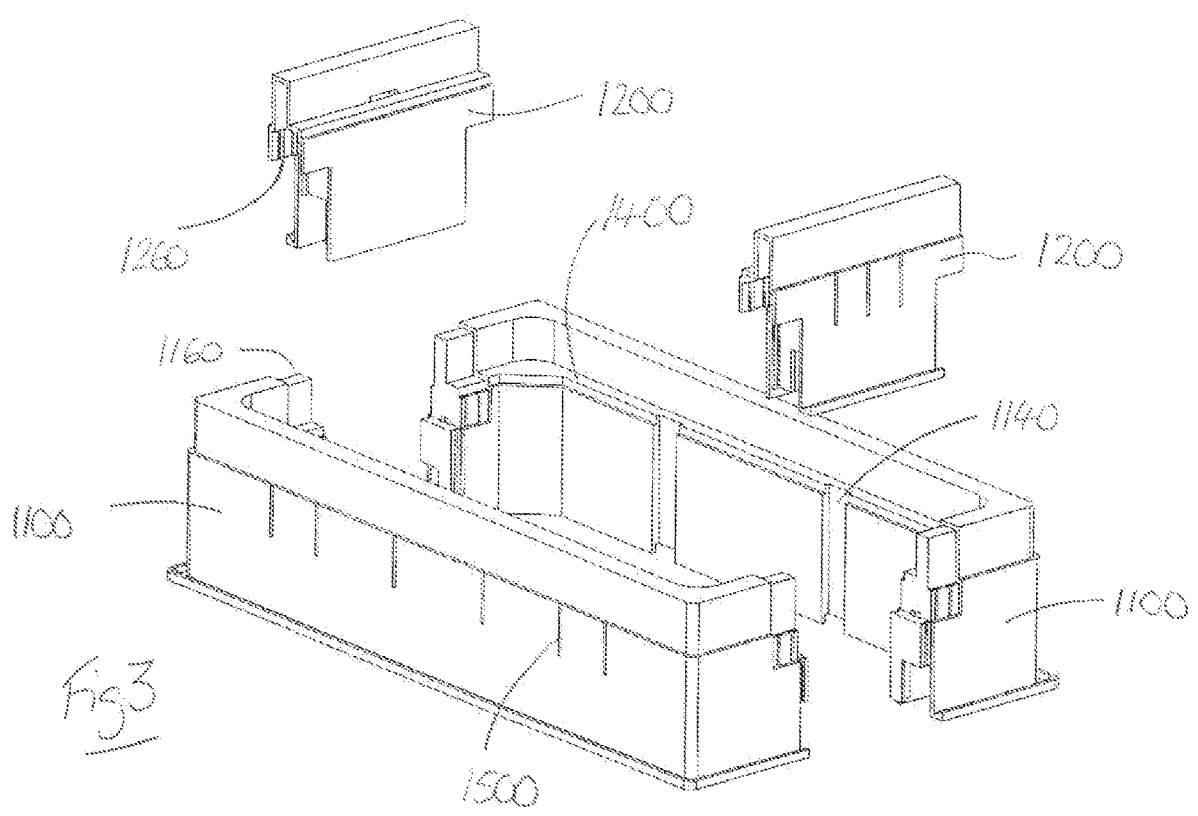
FIG. 3 is an exploded perspective view of part of the access chamber of FIGS. 1 and 2.
Figure 4:
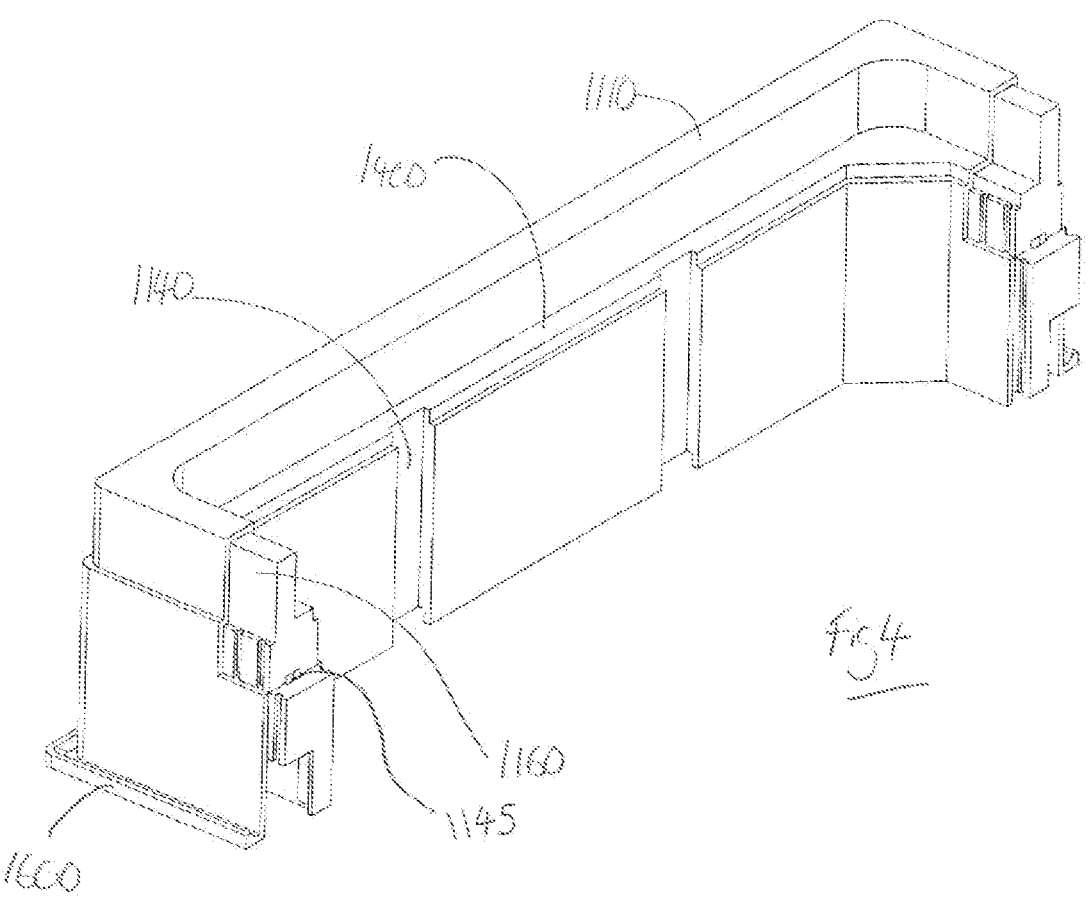
FIG. 4 is a detailed perspective view of an upper side of a first type of wall portion of the access chamber of FIGS. 1-3.
Figure 5:
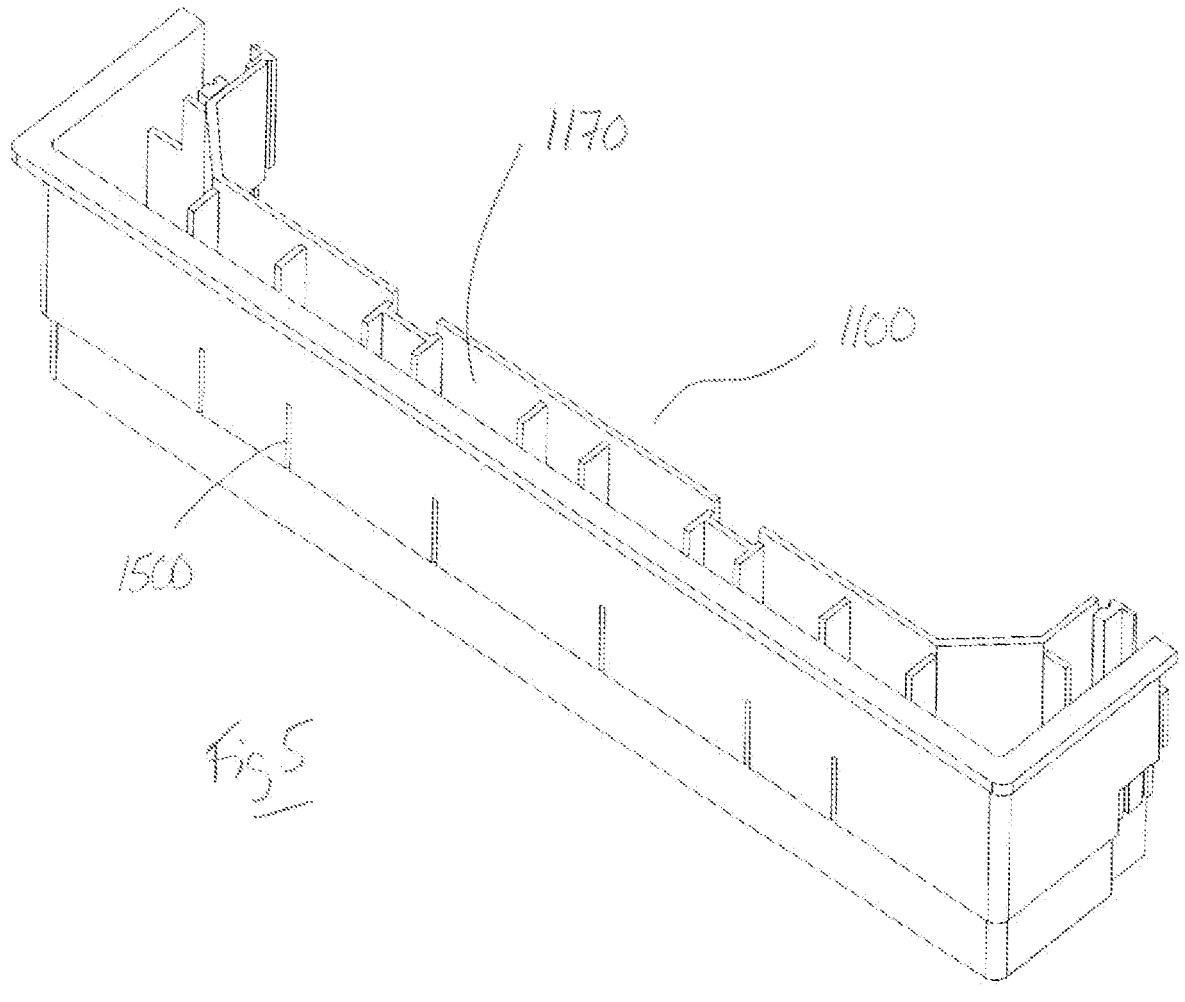
FIG. 5 is a detailed perspective view of an underside of the wall portion of FIG. 4.
Figure 6:
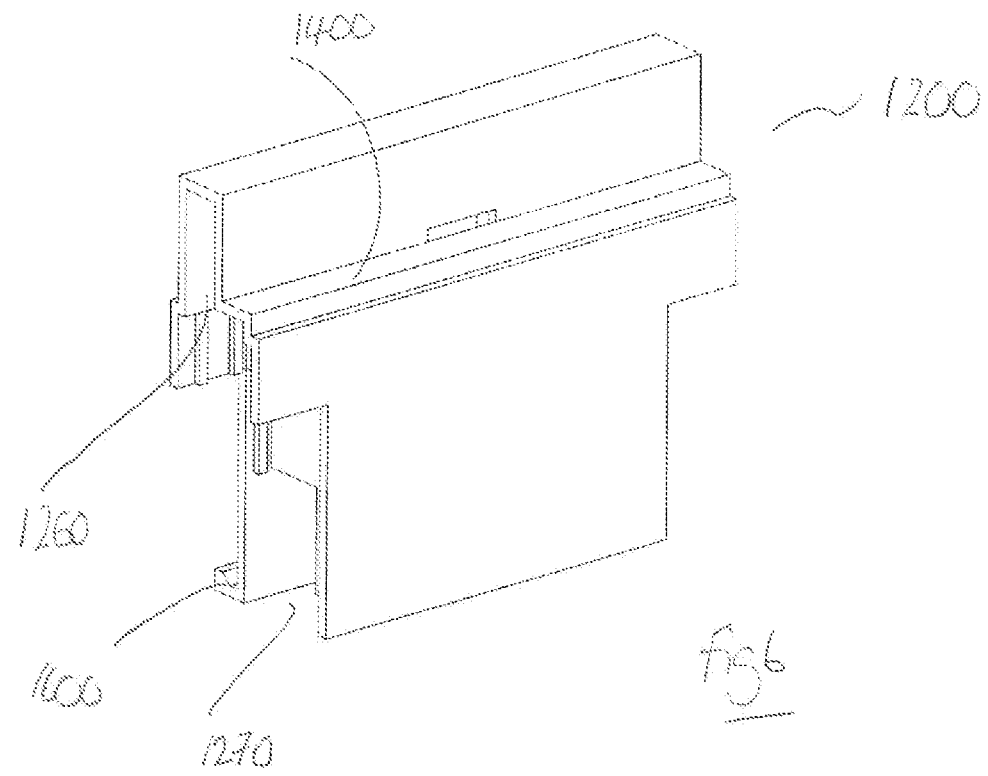
FIG. 6 is a detailed perspective view from above of a second type of wall portion according to the first embodiment of the present invention.
Figure 7:
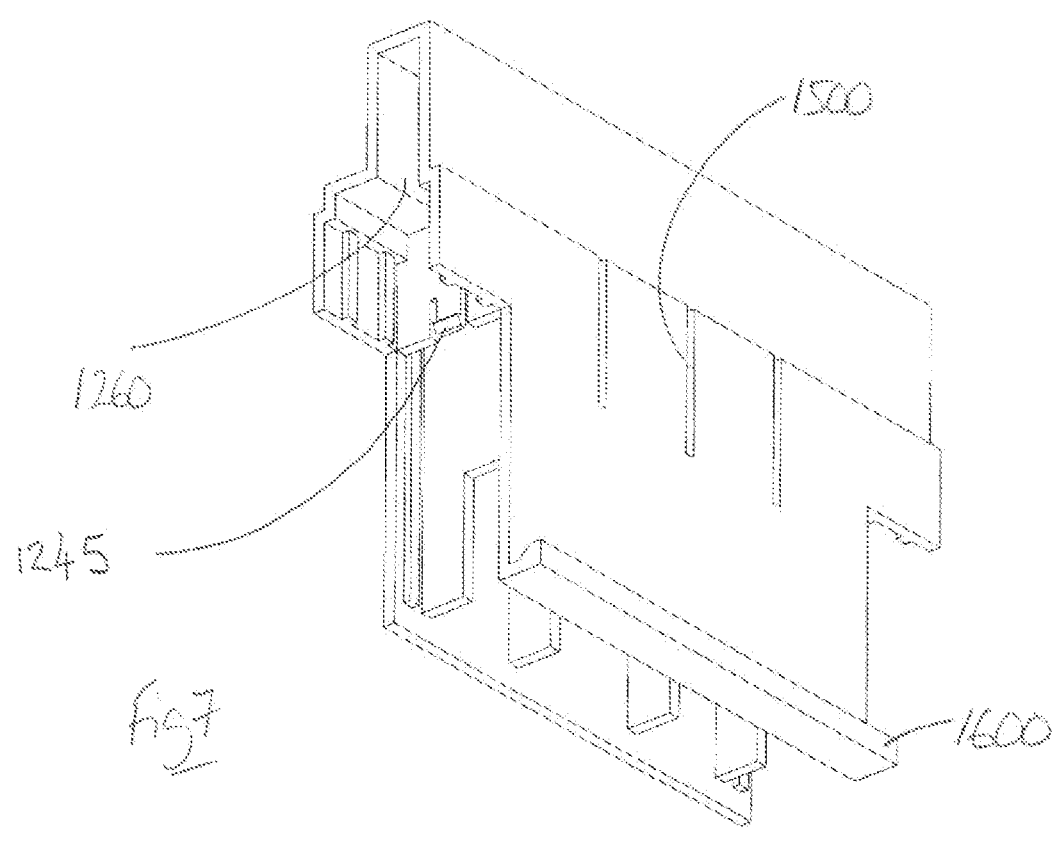
FIG. 7 is a detailed perspective view from below of the wall portion of FIG. 6.

FIG. 3 shows the wall portions 1100 and 1200 separated. In the embodiment shown, the wall portions 1200 are shorter in perimetric length and are used to connect the longer wall portions 1100. They do so by a sliding interlock engagement, particularly between upper recesses 1260 of the wall portions 1200 and upper projections 1160 of the wall portions 1100, as will be appreciated better from a consideration of FIGS. 4 and 5, showing the wall portion 1100 respectively from above and below, and FIGS. 6 and 7, showing the wall portion 1200 respectively from above and below. FIG. 7 shows a resiliently deformable tab 1245 which may be inserted into a socket 1145 (FIG. 4) of a wall portion 1100 in a push-fit, more preferably a snap-fit, engagement i.e. the tab deflects on initial contact with the socket before returning to its previous configuration to form a latching engagement.

When joined together, the wall portions (in this case two of 1100 and two of 1200) form a continuous ring unit R. In use, the ring units are stackable, so that the overall wall height of the resultant access chamber may be made to any height, as required by the local terrain, and in particular the depth below the ground surface below which the services run. Along lower edges 1120 and 1220, respectively, of wall portions 1100 and 1200, are lower recesses 1170 and 1270 which are provided to accommodate upper edges 1110,1210 of a lower wall portion of the same type (1100 or 1200) when the wall portions are so stacked.

Figure 8:
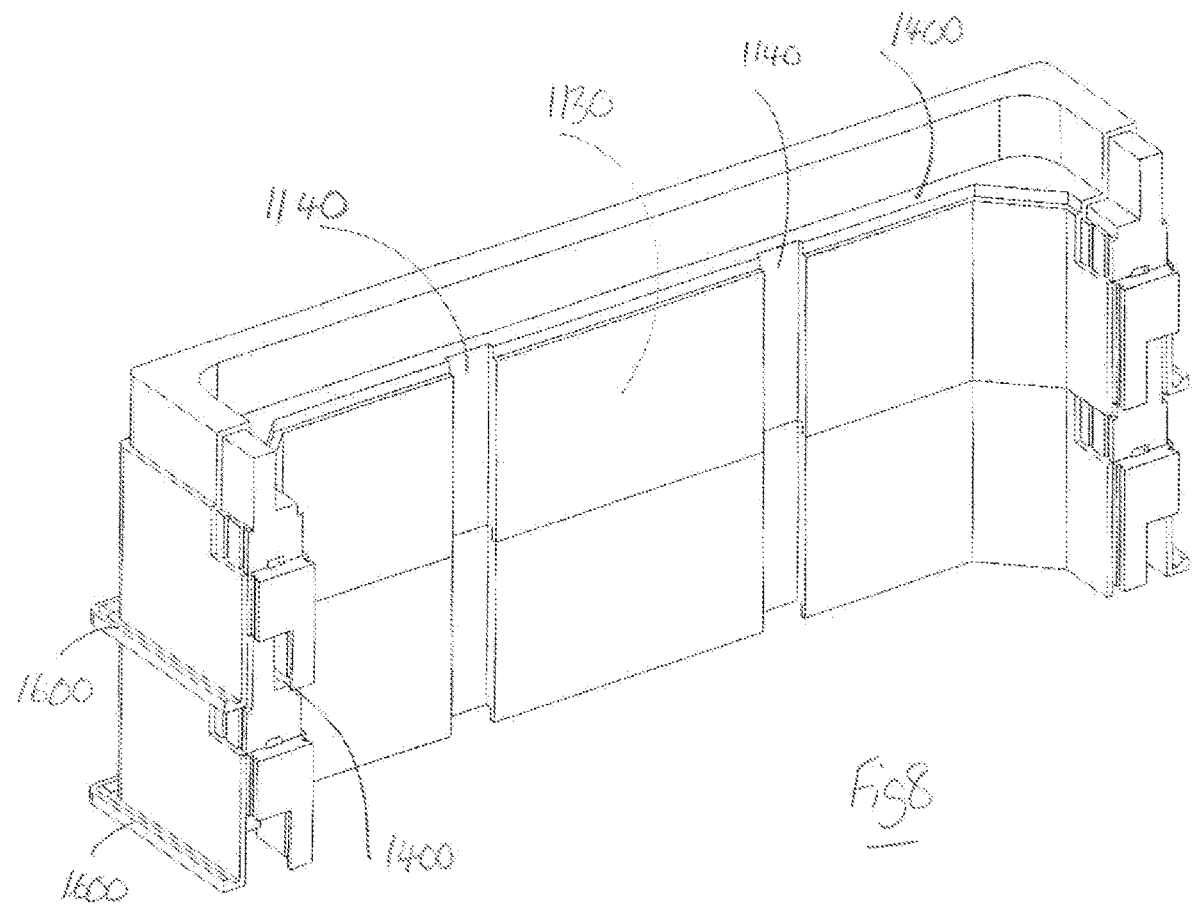
FIG. 8 shows in detail two of the first type of wall portions in stacked configuration.
Figure 9:
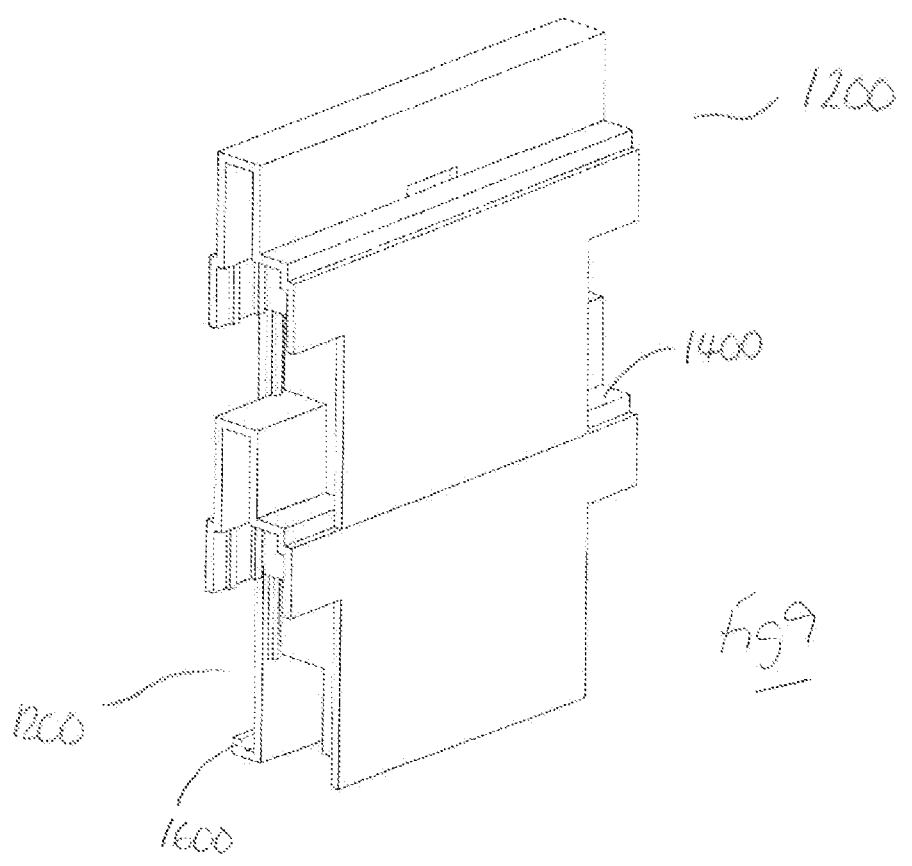
FIG. 9 shows in detail two of the second type of wall portions in stacked configuration.

FIG. 8 shows two of the first wall portions 1100 in a stacked configuration. The internal wall surfaces 1130 remain substantially flush, and the channels 1140 lie in registration so that they are substantially continuous throughout the surface 1130. The upper wall portion 1100 completely encloses the rebate 1400 of the lower wall portion and effectively moves it to the new, upper level. The same is true of the wall portions 1200, as shown in FIG. 9.

Each of the wall portions 1100 and 1200 has, at a lower edge, respectively 1120 and 1220, an externally facing lip projection 1600 which extends around the periphery of the access chamber at each vertical stage. The lip helps to keep the ring units fixed into the surrounding backfill, such as earth and/or concrete. Furthermore, the lips may also aid in disassembly of the modular access chamber.

Figure 10:
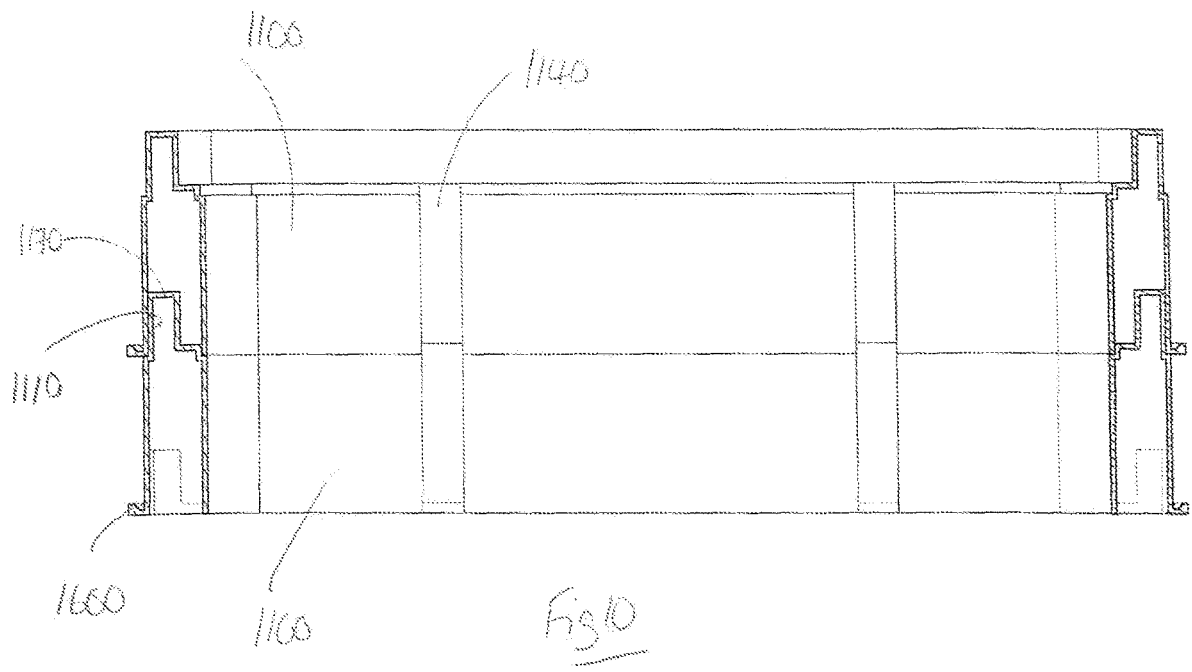
FIG. 10 is a side internal view of two of the first type of wall portions in stacked configuration.

FIG. 10 is an end view of one of the first type of wall portions 1100. The ends are shown highlighted by hatching, from which can be seen the interlocking of the recess 1170 of the lower edge of the higher component with the upper edge 1110 of the lower component in the stack.

Figure 11:
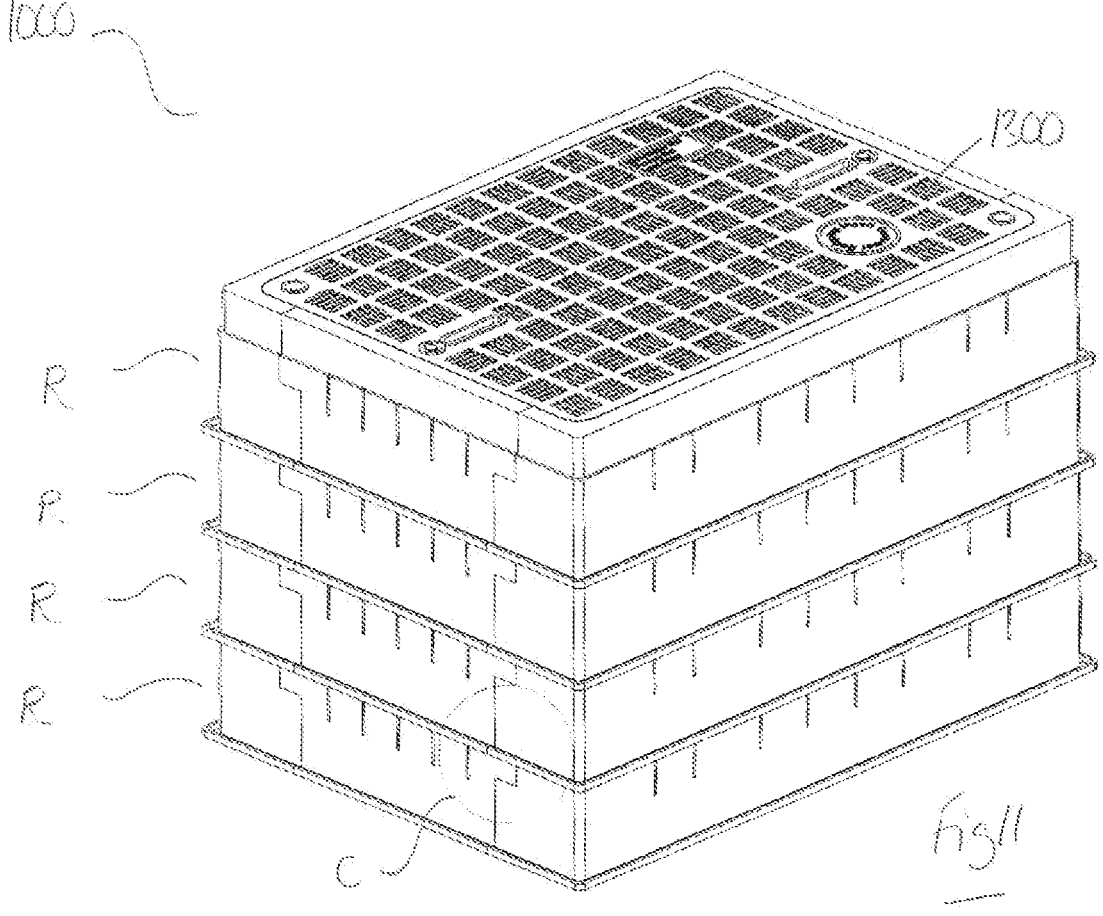
FIG. 11 shows several of the wall portions in stacked configuration, together with a cover.

FIG. 11 shows the access chamber with four stacked ring units R. It can be seen that as each ring unit is placed on top of its predecessor, the rebate on the lower ring unit is covered, leaving a flush inner surface and only the topmost ring unit maintains the rebate for accommodating the cover 1300.

Within Circle C of FIG. 11 is shown a stepped connection region between adjacent wall portions 1100 and 1200 in the same ring unit. In this region, where the two different types of wall portion meet, complimentary-shaped surfaces of the two types meet in a step-shaped interface/profile. This feature makes the wall in the stacked, assembled access chamber stronger than if the interface was a continuous vertical line.

Figure 12:
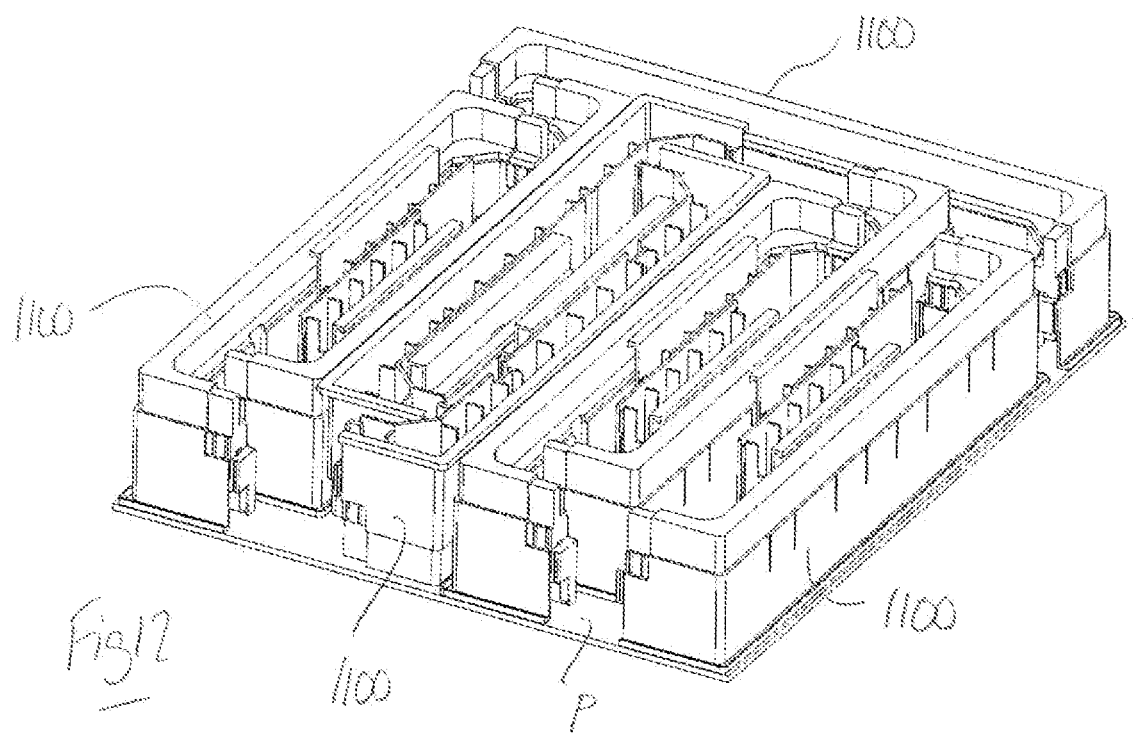
FIG. 12 is a perspective view of multiple wall portions nested for transportation and/or storage.

FIG. 12 shows the apparatus in a disassembled form for transportation and shipping. In the drawing, the wall portions 1100, which are the largest components of the access chamber, are able to lie nested on a support pallet P. Eight such units can be accommodated on the same level on the pallet in the example shown. Further layers of nested wall portions may stack on the pallet, together with short wall portions 1200 and covers 1300 (not shown). This provides a significant advantage over previously considered pre-fabricated access chambers, in which much of the volume is wasted space.

Figure 13:
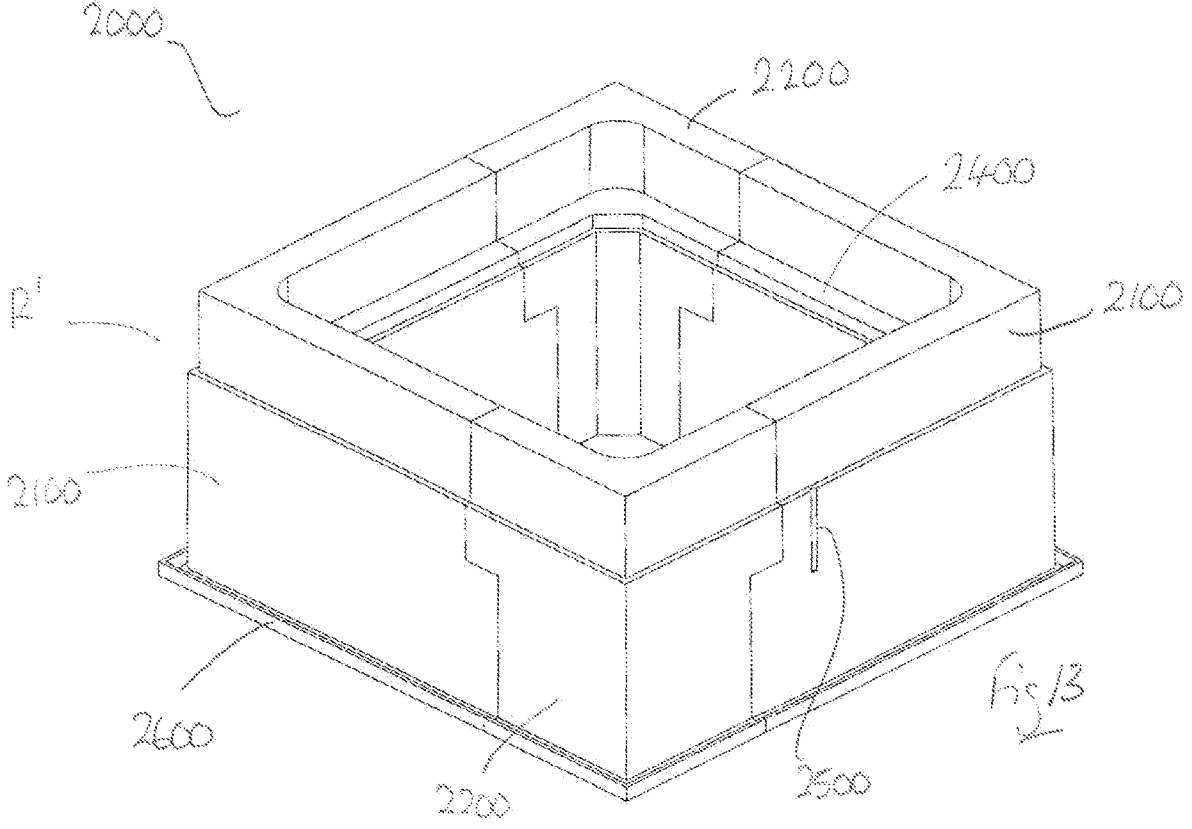
FIG. 13 is a perspective view from above of a second embodiment of access chamber, according to the present invention.

FIG. 13 shows generally at 2000 a second embodiment of access chamber. The second embodiment is of an access chamber that is generally square in plan and may typically be of a smaller plan area than the first embodiment. The chamber 2000 comprises first and second types of wall portion 2100 and 2200, which interlock to form a substantially continuous perimeter wall as a ring unit R' which may be stacked with others, in a similar manner to the first embodiment above. In this case, both the first and second types of wall portion 2100 and 2200 are generally L-shaped. The second embodiment of access chamber also benefits from complimentary-shaped surfaces of the two types that meet in a step-shaped interface/profile. This feature makes the wall in the stacked, assembled access chamber stronger than if the interface was a continuous vertical line.

As with the first embodiment, on the interior of the ring unit a rebate 2400 is provided to support a cover (not shown). Similar features to the chamber of the first embodiment are labelled using similar reference numerals.

Figure 14:
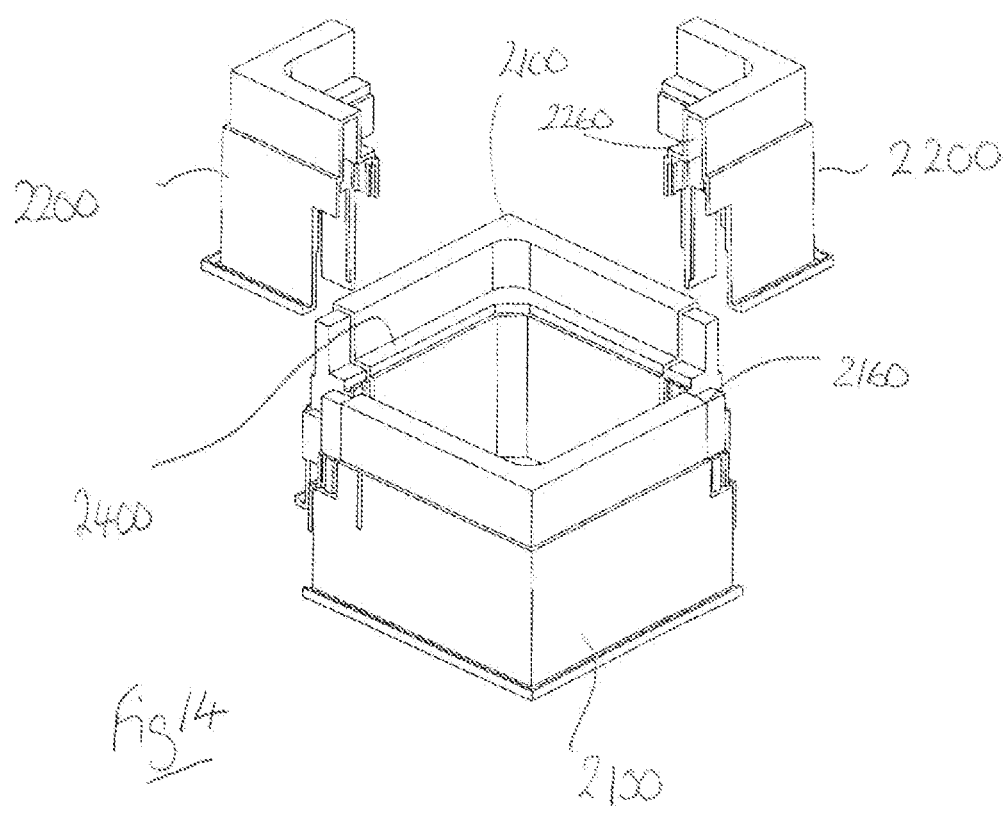
FIG. 14 shows the access chamber of FIG. 13 in a partly disconnected configuration.

With reference to FIG. 14, to assemble the ring unit R', the first wall portions 2100 are brought together before the second wall portions 2200 are slid over to connect the first wall portions.

FIG. 15 shows an access chamber according to the second embodiment including three ring units R' that have been stacked. Each stacked wall portion covers the rebate of the wall portion below it, leaving the rebate at the topmost ring unit. The cover is omitted from the drawing. Again, the interface between the two different types of wall portion 2100 and 2200 comprises a stepped region, so that no continuous vertical join is created down the wall.

Figure 16:
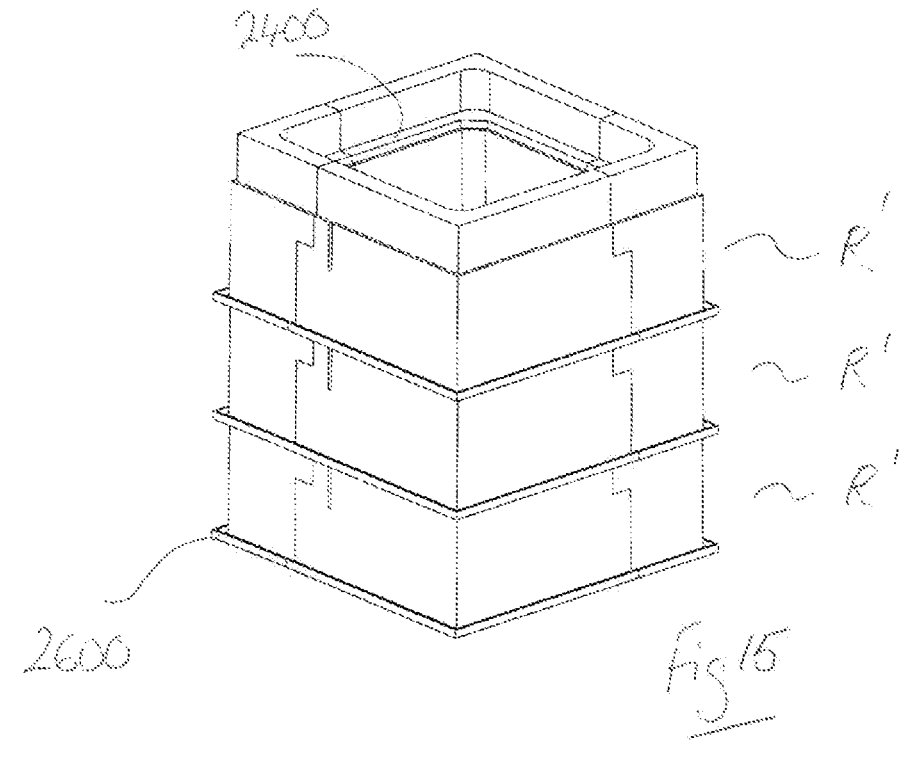
FIG. 16 shows the second embodiment of access chamber in a storage/transportation configuration.
Figure 16:
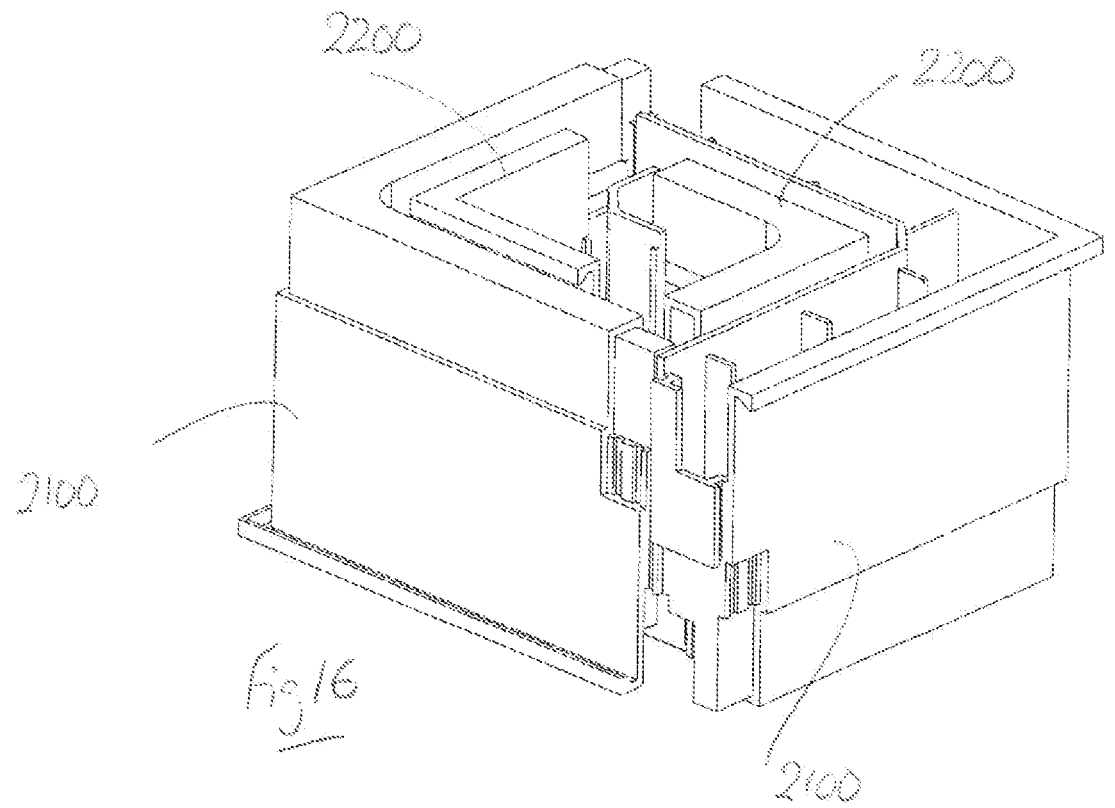

FIG. 16 shows the components of the access chamber in a nested configuration suitable for transportation and/or storage.

Figure 17:
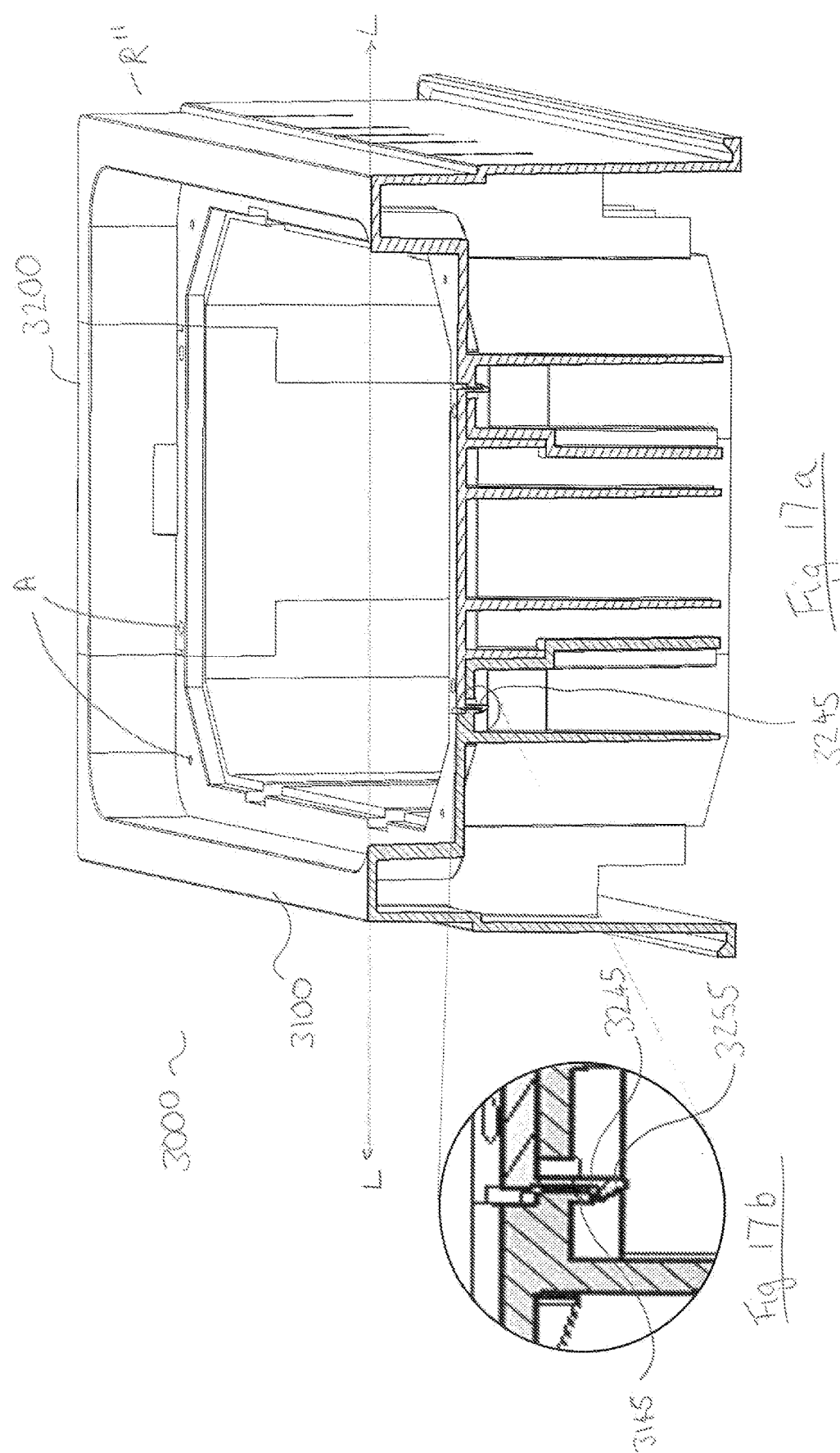
Figure 18:
FIG. 18 is a perspective sectional view of several wall portions according to the third embodiment of the present invention, stacked.

FIG. 17*a* shows generally at 3000 an access chamber according to a third embodiment of the present invention, with cover lifted therefrom. Two first-type wall portions 3100 and two second-type wall portions 3200 fit together to form ring structure R". A rebate 3400 is formed along the inside of the ring structure R" from the joining of individual rebates of the wall portions. The rebate 3400 has a plurality of apertures A to allow for fixing means to pass therethrough, for example, if a cover were to be secured to the rebate of the access chamber 3000. FIG. 17 shows a sectional view of two first-type wall portions 3100, and a second-type wall portion 3200 along line L, with the internal parts shown by hatching. As with the first and second embodiments of the present invention, the first-type wall portion interlocks with the second-type wall portion. In this embodiment, the interlocking of wall portions is also facilitated by a push-fit, more preferably a snap-fit, engagement/interaction. FIG. 17*b* shows a first-type wall portion 3100 comprises a socket 3145, into which a resiliently deformed tab 3245 of second-type wall portion 3200 is received. Tab 3245 of the second-type wall portion 3200 comprises a tapered protrusion member 3255 which permits tab 3245 to be received by socket 3145 when moved towards the socket, but does not allow for easy disengagement of tab 3245 and socket 3145 when moved away from the socket. This third embodiment of access chamber also benefits from complimentary-shaped surfaces of the two types that meet in a step-shaped interface/profile. This feature makes the wall in the stacked, assembled access chamber stronger than if the interface was a continuous vertical line A sectional view of this interaction can be seen in FIG. 18 along line L'.

Access chambers according to the invention are modular and so allow for nesting of the components when shipping or moving. The modular aspect is also beneficial when fitting a chamber around existing subterranean fixtures, such as cables, which could prove problematic for an integrally moulded access chamber.

The access chamber may be assembled readily by an operative without requiring special skill. The wall portions slot together to form ring units which are then stacked. The cover may be secured to the top-most wall portions using fixtures, such as screws, which pass through the specially provided holes. The access chamber can be assembled from a small number of wall portions and while fixing elements may be used for reinforcement of the chambers, they are not always necessary. There being few components, an operative working alone out of a van containing a pallet of parts, may quickly assemble an access chamber on-site.

The access chamber may be assembled to any desired height, which is beneficial over uneven terrain. Whilst allowing this, the internal walls each ring unit remain substantially flush with one another, creating a straight internal wall on which to rack wires on, for example. This feature also allows for personnel to climb into the chamber, without a risk of snagging, and be able to access the bottom of the chamber.

Whilst endeavouring in the foregoing specification to draw attention to those features of the invention believed to be of particular importance, it should be understood that the applicant claims protection in respect of any patentable feature or combination of features referred to herein, and/or shown in the drawings, whether or not particular emphasis has been placed thereon.

The invention claimed is:

1. A modular access chamber suitable for providing access to underground services, the chamber comprising
    a plurality of connectable wall portions and a cover member,
    wherein the wall portions are stackable to permit the height of the chamber to be adjusted,
    wherein one or more of the wall portions comprises a rebate portion for receiving the cover member, and
    wherein the wall portions are arranged to meet at an interface comprising a stepped profile.

2. An access chamber according to claim 1, wherein the rebate portion is integrally formed in the wall portion.

3. An access chamber according to claim 1, wherein the wall portions are arranged to connect together to form a ring unit.

4. An access chamber according to claim 1, wherein the rebate portion is formed at or adjacent an upper edge of the wall portion.

5. An access chamber according to claim 1, wherein the wall portions comprise profiles at lower edges thereof, which profiles are shaped so as to complement/fit with the rebate of another wall portion when the wall portions are stacked.

6. An access chamber according to claim 1, wherein when the wall portions connect together, the rebate portions on the wall portions become aligned, to provide a substantially continuous rebate surface.

7. An access chamber according to claim 1, wherein the rebate portion is arranged to receive a lower edge of another wall portion stacked thereon or, if the wall portion is an uppermost one, the rebate may receive the cover.

8. An access chamber according to claim 1, wherein at least four wall portions are connectable to form a ring unit.

9. An access chamber according to claim 1, wherein the cover is arranged to be secured to one or more of the wall portions by fixing means arranged to pass at least partly through one or more of the cover and the wall portion.

10. An access chamber according to claim 1, wherein the wall portions are arranged to connect together by matingly engaging connecting parts, such as male/female parts.

11. An access chamber according to claim 1, wherein the wall portions are arranged to connect together by a push fit/snap-fit arrangement.

12. An access chamber according to claim 3, wherein ring units are stackable, one upon the other, so that internal surfaces of the wall portions lie substantially flush with one another.

13. The access chamber according to claim 3, wherein the wall portions are adjacent wall portions in the same ring unit.

14. The access chamber according to claim 13, wherein the adjacent wall portions comprise complimentary-shaped surfaces in the stepped profile.

15. The access chamber according to claim 3, wherein the stepped profile is such that there is no continuous vertical join created down the wall portions.

16. The access chamber according to claim 12, wherein the internal surfaces of one or more of the wall portions comprise at least one recessed channel for receiving cable conduits in use.

17. The access chamber according to claim 1, wherein outer surfaces of one or more of the wall portions comprise markings at spaced locations for indicating suitable positions to be drilled through or cut into.

18. A method of assembling a modular access chamber for providing access to underground services, the method comprising the steps of connecting together a plurality of wall portions at an interface comprising a stepped profile and placing a cover into a rebate portion of one or more of the wall portions.

19. A method according to claim 18, wherein the method includes stacking ring units to achieve a required height of the access chamber.

* * * * *